Patented July 13, 1948

2,444,924

UNITED STATES PATENT OFFICE 2,444,924

PROCESS OF OXIDIZING PRIMARY OR SECONDARY ALCOHOLIC HYDROXYL GROUPS OR ALDEHYDE GROUPS

Ladislaus Guillaume Farkas and Ozjasz Schächter, Jerusalem, Palestine

No Drawing. Application September 28, 1945, Serial No. 619,256. In Palestine October 1, 1944

16 Claims. (Cl. 260—495)

This invention relates to the oxidation of alcoholic hydroxyl groups or of aldehyde groups. More specifically, the invention is concerned with the oxidation of primary and secondary alkanols and alkanals, and of similar compounds. The invention has more particularly as its object to provide a convenient process for the preparation by straight, non-disruptive oxidation of such compounds as are not or only difficultly obtainable so far by other methods.

The terms "straight" and "non-disruptive" used for the qualification of the term "oxidation" are meant to restrict the invention to such oxidation reactions as lead to the removal of hydrogen from the hydroxyl or aldehyde groups and/or to the addition thereto of oxygen without the splitting-off of carbon atoms from the molecule of the compound so treated, with the formation of carboxyl or aldehyde groups from primary alcoholic hydroxyl group (the carboxylic acid so formed being usually esterified with the starting alcohol present in excess), of keto groups from secondary hydroxyl groups, and of carboxyl groups from aldehyde groups.

The straight, non-disruptive oxidation of many substances of the kind in question can be carried out with a great variety of oxidizing agents. However, in the great majority of known processes of this kind, the reaction is either not complete, or too slow for practical performance for preparation purposes, or accompanied by undesired side reactions, usually of a disruptive character. In particular, it is known that chlorine can be used as an oxidizing agent for the conversion of alcohols into higher oxidized substances, but usually the use of chlorine for this type of reactions entails the drawbacks stated above. In addition, the chlorine has a tendency to enter the molecule of the compound to be oxidized as a substituent, particularly at elevated temperatures.

It has now been found that the various drawbacks of known various oxidizing agents can be avoided and a virtually complete, smooth and quick straight, non-disruptive oxidation of the compounds of the kind specified can be obtained, to the virtual exclusion of side reactions, if the oxidation is carried out by means of oxidizing agents other than bromine in the presence of a relatively small amount of elementary bromine.

Accordingly, this invention consists in a process of oxidizing compounds of the kind referred to, wherein the oxidation is performed by the combined action of an amount of bromine stoichiometrically small in proportion to the amount of the compound to be oxidized, and an amount stoichiometrically corresponding to the desired amount of oxidation product of an oxidizing agent, other than bromine, that is capable of oxidizing the bromide ion to elementary bromine under reaction conditions.

As examples of oxidizing agents of the class referred to hereinbefore, we may employ compounds containing both halogen and oxygen atoms, such as chlorine dioxide and other oxides, or chlorates, bromates, chlorites, bromites, hypochlorites, perchlorates and perbromates of the alkalies, alkaline earths or other metals or non-metals such as the above mentioned salts of sodium, potassium, calcium, magnesium, zinc or ammonium, or oxides of amphoteric metals in valence states of at least +4, such as dioxides of (chlorine) manganese or lead, chromic acid or its salts such as potassium chromate or bichromate, manganates or permanganates of sodium, potassium calcium, magnesium, and other metals. Although these are preferred, elementary chlorine, or oxygen, or ozone may also be employed.

The bromine may be initially added to the reaction mixture in elementary form or as a bromide or hypobromite such as sodium, potassium or calcium bromide or hypobromite. If it is added as a bromide, this will at once be oxidized to elementary bromine by the oxidizing agent present, and the elementary bromine originally added or thus produced, or the hypobromite, as the case may be, becomes active towards the compound to be oxidized, oxidizes a corresponding amount thereof and is thereby reduced itself to bromide, and the cycle begins afresh.

Where a bromate is used as an oxidizing agent and is gradually converted into the bromide, the latter is produced in a theoretical yield. Since bromate can easily be prepared in a highly pure state, the bromide is correspondingly pure. This is especially remarkable in view of the difficulties encountered in the hitherto usual process of reducing bromate to bromide. Accordingly, under another aspect, a particular embodiment of the present invention can be defined as a process of preparing bromides of the highest degree of purity, wherein a pure bromate is subjected to reduction by the combined action of bromide ion and an organic substance, or a mixture of organic substances, containing one or more primary and/or secondary alcoholic hydroxyl groups and/or aldehyde groups. The bromate employed in this case can be sodium, ammonium, potassium, calcium, magnesium bromate or the bromate of some other metal.

The process according to this invention may be carried out in the presence of a solvent capable of dissolving with the oxidized reaction product. It is even possible, and sometime advantageous, to use as such solvent another portion of the reaction product, whereby a more concentrated solution of the latter is obtained which is easier to be separated and worked up.

Materials that can be used as solvents may be hydrocarbons, halogenated hydrocarbons, acids, esters, ethers, phenols and the like such as benzene, chlorobenzene, acetic acid, propionic acid, ethylacetate, butylether, phenol, cresol or xylenol.

The reaction can be carried out at atmospheric pressure, reduced pressure, for example at 10 to 300 mm. mercury pressure, or at superatmospheric pressure for example at one to ten atmospheres. The proper pressure range can be conveniently adjusted to the required reaction temperature when the reaction can be carried out at the boiling point of the mixture under refluxing conditions so that the reaction temperature can be kept readily constant.

The temperature of reaction ranges from about 30° C. up to about 150° C., temperatures from about 35° C. to about 80° C. being preferred.

It has been found, furthermore, that the oxidation reaction can be promoted by catalysts such as copper compounds, e. g., copper bromate; molybdenum compounds, e. g., molybdena or sodium molybdate; and other compounds of catalytic metals such as those of the "transitional" elements, which have their differentiating electron in the second from the outermost shell. A convenient periodic table showing this relationship is shown in the Journal of Chemical Education, August 1939, page 394. The elements of the first transitional series are those having atomic numbers of 21 to 30 inclusive, those of the second transitional series are those having atomic numbers 39 to 48 inclusive; those of the third transitional series are those having atomic numbers 57 and 72 to 80, inclusive; and those of the fourth transitional group which are now known, the group being as yet incomplete, are those having atomic numbers 89 to 92 inclusive. Examples of suitable metals of this type are titanium, vanadium, chromium, iron, cobalt nickel, columbium, the group of the platinum metals, tantalum and tungsten.

The amount of the oxidation agent employed for each mole of alcohol or other hydroxy compound to be oxidized may be the amount corresponding to 0.2 to 2 gram atoms of available oxygen and preferentially the amount corresponding to 0.3 to 1 gram atom available oxygen. For the purpose of calculating the amount of the oxidizing agent one mole of calcium bromate corresponds to six gram atoms of available oxygen, one mole sodium hypochlorite corresponds to one gram atom of available oxygen and one mole of chlorine corresponds to one gram atom of available oxygen.

Whenever less than stoichiometric quantities of oxidizing agent is employed the excess of the material to be oxidized serves as solvent.

The amount of bromine used in conjunction with the oxidizing agent according to the present invention may be 0.01 mole to 0.05 mole for each gram atom of available oxygen in the oxidizing agent. It is preferred to use free bromine in amounts of 0.02 to 0.2 mole for each gram atom of available oxygen in the oxidation agent.

When the bromine is released in the course of the oxidation reaction from such bromine compounds as hydrogen bromide or copper bromide it is preferred to use hydrogen bromide in an amount corresponding to 0.03 to 0.5 mole of bromide for each gram atom of available oxygen in the oxidizing agent.

The process according to this invention has proved most suitable for the preparation, for example, of esters of various alcohols with the corresponding acids, such as ethyl acetate or butyl butyrate, or higher ones like hexyl caproate, lauryl laurate and others for the corresponding alcohols. From various secondary alcohols, the corresponding ketones have been prepared. Where the starting material contains both primary and secondary alcoholic hydroxyl groups, the oxidation of the secondary hydroxyl group is in general far quicker than that of the primary one. Similarly, where a compound contains a hydroxyl group besides an aldehyde group, the oxidation of the latter is in general much quicker than that of the former. This different behaviour of different groups towards the oxidizing agents can be utilized for conducting the reaction in a desired direction in preference to any undesired oxidation within the same system.

The invention is illustrated in the following examples to which it is, of course, not restricted. Where in the following, reference is made to aqueous solutions of calcium bromate and of hydrogen bromide, these are respectively of 35.5% strength by weight (1.2 moles per kg. of solution) and 44% by weight.

*Example 1*

288 grs. of ethyl alcohol of 96% strength (corresponding to 6 moles) are mixed in an Erlenmeyer flask with 111 grs. of solid potassium bromate (0.67 mole) and 32 grs. of elementary bromine (0.2 mole). The mixture is stirred. The reaction which soon sets in is exothermic and causes the mixture to heat. When a temperature of 50° C. is reached the flask is cooled and the mixture is kept at 50° C. for about 6 hours, first by further cooling, later on by slight heating. By this time all the bromate has disappeared and about 82% of the originally added free bromine is reduced to hydrogen bromide. The reaction could be continued until the last traces of bromine have disappeared. However, the reaction becomes then very slow so that it is preferable to interrupt it and to dispose of the bromine by other means, for example, by way of reduction with sulfide or with an aqueous solution of sulfur dioxide.

From the reaction mixture, in which the ethyl acetate is partly split into acetic acid and ethyl alcohol according to the equilibrium of the system, the ethyl-acetate is recovered by distillation, the distillate being a ternary azeotropic mixture of ethyl acetate, ethyl alcohol and water from which the ester can be separated in known manner.

92 grs. of ethyl acetate are finally obtained, which is a yield of 95% of the theoretical amount calculated by the consumption of bromine and bromate.

The potassium bromide, which is formed in the theoretical amount corresponding to the amount of bromate employed, can be crystallized from the residue of the distillation aforesaid and is at once obtained with a high degree of purity which can still be enhanced by re-crystallization.

The free bromine originally used for the reaction has been converted into free hydrobromic acid which is equally contained in said residue and can be recovered therefrom by distillation as a concentrated aqueous solution of constant boiling point.

In this example, the alcohol is originally present in the reaction mixture in an excess of six times the amount thereof which is oxidized to acetic acid, or three times the amount contained in the ethyl acetate finally obtained. The concentration of free bromine at any moment of the reaction is about 0.5 mole per liter.

Comparative tests have shown that in those cases where the alcohol used as starting material is soluble in water, the excess of alcohol has an influence on the speed of the reaction, the speed being the greater, the greater the excess. Moreover, the speed of the reaction is substantially proportional to the concentration of free bromine in the mixture.

*Example 2*

288 grs. of ethyl alcohol of 95% strength (by weight), corresponding to 6 moles, are gradually mixed with 834 grs. of an aqueous calcium bromate solution (1 mole) and 86 grs. of hydrogen bromide solution. In an Erlenmeyer flask provided with stirring paddle and reflux condenser, the whole amount of alcohol is mixed with the whole amount of hydrogen bromide and 100 grs. of the calcium bromate solution, the mixture is stirred and within a short time spontaneously heats up to boiling. The rest of the calcium bromate solution is then slowly added (through the condenser or a side-tube provided for this purpose) within about half an hour at such a rate that the mixture continues to boil while being cooled. After a further stirring of 2½ hours, the reaction is at an end. The concentration of free bromine in the mixture, which all the time over was of the order of 0.5 to 0.25 mole per liter, has by then dropped to a small residual amount which may be removed as described in Example 1.

The ethyl acetate is recovered from the reaction mixture by distillatiton. Its yield is about 90% of the theoretical amount.

*Example 3*

By a slight variation of the conditions described in Example 2, acetaldehyde can be obtained as a reaction product besides ethyl acetate. The reaction vessel is connected with an ordinary Liebig condenser instead of with a reflux condenser.

144 grs. of ethyl alcohol (96%), 23 grs. of hydrobromic acid solution and 20 grs. of calcium bromate solution are initially introduced into the reaction vessel. After 5 minutes, the mixture has spontaneously heated up to boiling, first at about 78° C. and gradually rising to 82° C. The condensate leaving the condenser is collected. In the course of about 2 hours, further amounts of alcohol and calcium bromate solution are alternatingly and gradually added through a side-tube, up to a total amount of 480 grs. (10 moles) of the former and 500 grs. (0.6 mole) of the latter. About 30 minutes after the addition of the last portion of bromate, the temperature of the mixture drops below boiling point. It is advisable to add a further 15 grs. of hydrobromic acid solution after about one hour from the beginning in order to compensate for the progressing dilution of the free bromine in the mixture.

From the condensate, 123 grs. of ethyl acetate (1.4 moles) and 30 grs. of acetaldehyde (0.68 mole) are obtained. The bulk of the ethyl acetate distils spontaneously during the reaction the rest can be recovered from the reaction mixture by heating the latter after the reaction has been completed.

Under the thermal conditions here described, the amount of bromine entering the alcohol by way of substitution is not quite negligible. About 5% of the total bromine forms bromo-compounds, corresponding to a loss of about 1% of the oxidizing capacity of the bromate used.

*Example 4*

222 grs. of n-butyl alcohol (3 moles) are mixed with 417 grs. of calcium bromate solution (0.5 mole) and 54 grs. of hydrogen bromide solution. The mixture, which is stratified in an alcoholic and an aqueous layer, is vigorously stirred and its temperature rises soon to 60° C. The mixture is kept at this temperature, by cooling during about the first 30 minutes, and by heating thereafter. About 2 hours after the beginning of the reaction, the brown bromine colour of the mixture has considerably brightened and the reaction can be brought to an end by heating the mixture to 90° C. for about 15 minutes.

Butyl butyrate is thus obtained in a virtually theoretical yield. The calcium bromide produced by the reduction of calcium bromate is quantitatively to be found in the aqueous layer of the reaction mixture, the hydrogen bromide is about equally distributed between the aqueous and alcoholic layers. The latter is washed with water, dried with sodium sulfate and rectified.

*Example 5*

306 grs. of normal primary hexyl alcohol (3 moles) are mixed with 417 grs. of aqueous calcium bromate solution and 64 grs. of hydrogen bromide solution, and the mixture is vigorously stirred whereupon it warms up very quickly. The temperature is held at 35° C., first by cooling, then by heating. The reaction is terminated after about 3 hours when the colour brightens considerably. If the mixture is then heated to about 60° C. for half an hour, the free bromine disappears completely.

Hexyl caproate is thus obtained in a yield of 95% of the theoretical amount.

*Example 6*

186 grs. of lauryl alcohol (1 mole) are mixed with 139 grs. of calcium bromate solution and 31 grs. of hydrobromic acid and the mixture, while being stirred, is held at 35° C. for about 3 hours and thereafter heated for about 30 minutes to 80° C. until the colour of bromine has completely disappeared.

Lauryl laurate is thus produced in a virtually theoretical yield.

*Example 7*

304 grs. of 2-benzoxy-ethanol (2 moles), commercially known as Benzyl-Cellosolve (trademark), C₆H₅CH₂OCH₂CH₂OH, are mixed with 111 grs. of solid potassium bromate (⅔ moles), 35 grs. of hydrobromic acid solution and 50 grs. of water, stirred for 4 hours at 50° C., and then heated to 60° C. for a short while. The corresponding ester,

forms in a yield of 97% of the theroretical amount, part thereof being saponified. The ester can be separated from the reaction mixture by distillation in vacuo under a pressure of about 1 mm. (mercury column), the main fraction distilling at about 103–104° C.

Example 8

288 grs. of ethyl alcohol of 96% strength by weight (6 moles) are mixed with 528 grs. of ethyl acetate (6 moles), 278 grs. of calcium bromate solution and 267 grs. of hydrobromic acid solution. The mixture initially stratifies in two layers. In the course of the reaction, water is formed and the two layers mix. The mixture is kept at 50° C. for 10 hours when all the bromate and the major part of the free bromine has been reduced. The rest of bromine is disposed of by means of an aqueous solution of $SO_2$. Ethyl acetate is obtained in a yield of more than 90% of theoretical amount.

Example 9

288 grs. of ethyl alcohol (96%) are mixed with 81.7 grs. of potassium chlorate (⅔ moles) and 177 grs. of hydrobromic acid. The mixture is heated to and kept at 50° C. for 5 hours and thereafter allowed to stand over night at room temperature. It then contains about 6 grs. of free bromine per liter which is suitably reduced by means of aqueous sulfur dioxide. The yield of ethyl acetate is about 93% of the theoretical amount.

The reaction between chlorate and hydrobromic acid is less easy and complete than that between bromate and hydrobromic acid. It is for this reason that the concentration of the acid is chosen higher than in the case of bromate.

Example 10

144 grs. of ethyl alcohol are mixed with 150 grs. of a molar aqueous cupric bromide solution, the mixture is heated to 50° C., and gaseous chlorine is introduced at the rate of 30 grs. during the first hour, 20 grs. during the second hour, and 6.5 grs. during a further half hour. The yield of ethyl acetate is of about 80% of the theoretical amount. About 10% of the chlorine used can not be accounted for and appears to enter as substituent into the organic molecules present. When chlorine acts on alcohol in the absence of bromine, mainly chloral is obtained.

Example 11

288 grs. of ethyl alcohol (96%), 174 of powdered manganese dioxide and 33 grs. of solid potassium bromide are mixed in an Erlenmeyer flask and 327 grs. of sulfuric acid (60%) are gradually added during 2 hours. The mixture is kept at 50° C. with stirring for 4 hours from the beginning of the addition of sulfuric acid. By this time the manganese dioxide has disappeared and the bromine is completely reduced.

Ethyl acetate is obtained in a yield of about 90% of the theoretical amount.

If ethyl alcohol is treated only with manganese dioxide and sulfuric acid in the absence of bromine, the reaction is uncontrollable and besides the formation of acetaldehyde, acetic acid and ethyl acetate, a substantial amount of disruption takes place with the formation of carbon dioxide.

Example 12

222 grs. of normal butyl alcohol and 60 grs. of a molar aqueous solution of cupric bromide are mixed in an Erlenmeyer flask and 400 grs. of an aqueous solution of sodium hypochlorite (2.5 molar, containing 2% of excess NaOH) are gradually added during 1 hour, the temperature being kept at 35°–40° C. The reaction mixture is then slightly acidulated with sulfuric acid. The butyl butyrate produced and the residual excess of butyl alcohol form a separate layer floating over the aqueous bottom layer which contains the salts produced. The two layers are separated by decantation, the alcohol and ester are dried with sodium sulfate and the ester is separated by distillation. The yield of butyl butyrate is almost theoretical. The amount of halogenides corresponding to the hypochlorite and the bromide used is to be found quantitatively in the aqueous layer.

Example 13

If butyl butyrate is prepared by the oxidation of butyl alcohol with sodium bichromate and sulfuric acid according to "Organic Syntheses," edited by H. Gilman (John Wiley & Sons, New York, "Collective Volume I," page 138), the reaction mixture being cooled with ice and care being taken that its temperature does not rise above 20° C., the yield is of 41 to 47%. If, however, 1 mole of HBr per liter is added to the reaction mixture which, for the rest, has the same composition, the reaction temperature can be raised to 50° C. and within one hour, butyl butyrate is obtained in a yield exceeding 80%.

Example 14

106 grs. of benzaldehyde (1 mole) are mixed with 55.7 grs. of solid potassium bromate, and 10 grs. of hydrobromic acid solution. The mixture is kept with stirring for 8 hours at 70° C.

Benzoic acid is thus obtained in an almost theoretical yield.

Example 15

49 grs. of acetaldehyde (90%) (1 mole) are dissolved in 222 grs. of normal butyl alcohol. To the solution 55.7 grs. of solid potassium bromate are added and 8 grs. of bromine are gradually introduced within about 20 minutes. The mixture is kept for 5 hours at 35° C., then the temperature is raised for a short while to 50° C.

Butyl acetate, which can be separated by distillation, is thus obtained in a yield of about 86%.

It is noteworthy that the oxidation attacks the carbonyl group in preference to the carbinol group which gives a possibility of preparing mixed esters.

Example 16

180 grs. of iso-propyl alcohol (3 moles) are mixed in an Erlenmeyer flask with 139 grs. of calcium bromate solution (⅙ mole), 180 grs. of water and 9 grs. of hydrobromic acid solution. The temperature rises spontaneously and is kept at 35° C. The free bromine has disappeared after about 3 hours. Acetone is thus obtained in a yield of about 93%.

Example 17

93 grs. of 2-dodecanol (0.5 mole) are mixed with 34.7 grs. of calcium bromate solution (1/24 moles) and 7 grs. of hydrobromic acid solution, and the mixture is kept for 20 minutes at 35° C. The corresponding ketone is obtained in a yield of about 90%.

Example 18

100 grs. of cyclohexanol (1 mole) are mixed with 69.5 grs. of calcium bromate solution and 8 grs. of hydrobromic acid solution and the mixture is kept for 3 hours at 35°–40° C.

Cyclohexanone is thus obtained in a nearly theoretical yield.

Example 19

90 grs. (1 mole) of butylene glycol (1:3) are mixed with 46.3 grs. of calcium bromate solution and 5 grs. of hydrobromic acid solution, the mixture is kept at 35 to 40° C. for 6 hours and then heated to 50° C. for a few minutes. The oxidation has attacked to 80% the secondary hydroxyl group and only to 20% the primary hydroxyl group.

Example 20

In order to show the promoting effect of copper (in the form of cupric ion), the following comparative experiments were made in which three batches, each containing 72 grs. of ethyl alcohol (96%) and 15 grs. of hydrobromic acid solution, were oxidized with equivalent (as to the amount of bromate ion) quantities of calcium bromate alone, a mixture of 80% of calcium bromate and 20% of cupric bromate, and cupric bromate alone respectively. The temperature was kept at 50° C. For comparison, the not-consumed bromate was ascertained after 1 hour, 2 hours and 2½ hours.

a. 70 grs. of calcium bromate solution.

Residual bromate after:

|  | Per cent |
|---|---|
| 1 hour | 40 |
| 2 hours | 19 |
| 2½ hours | 10 | b. 56 grs. of calcium bromate solution, plus 22.4 grs. of copper bromate solution (24%) (concentration of copper ion 0.1 gram atom per liter).

Residual bromate after:

|  | Per cent |
|---|---|
| 1 hour | 27 |
| 2 hours | 1.6 |
| 2½ hours | Nil | c. 111 grs. of copper bromate solution (24%) (concentration of copper ion about 0.44 gram atom per liter).

Residual bromate after 1 hour, nil.

The whole bromate and even 85% of the free bromine were consumed after 50 minutes.

Modifications of this invention which would occur to one skilled in the art are to be included in the scope of this invention as defined in the following claims.

We claim:

1. A process of non-disruptively oxidizing compounds selected from the class consisting of primary alkanols, secondary alkanols and alkanols, wherein the oxidation is performed in the liquid phase by the combined action of an amount of free bromine which is stoichiometrically small in proportion to the amount of the compound to be oxidized, and an amount stoichiometrically corresponding to the desired amount of oxidation product, of an inorganic oxidizing agent which contains an element selected from the group consisting of halogen and oxygen and which is capable of oxidizing bromide ion to bromine in aqueous solution in the temperature range of about 30°–80° C.

2. A process for the non-disruptive oxidation of a compound selected from the class consisting of primary alkanols, secondary alkanols and alkanols, which comprises contacting said compound in the liquid phase at an elevated temperature with an aqueous solution of a solid inorganic oxidizing agent which contains an element selected from the group consisting of halogen and oxygen and which is capable of oxidizing bromide ion to bromine in aqueous solution in the temperature range of about 30°–80° C., in the presence of free bromine in a molal concentration between about 0.01 and about 0.5 mole per gram atom of available oxygen in the oxidizing agent.

3. A process for the oxidation of a primary alkanol to a carboxylic acid which comprises contacting said alkanol in the liquid phase at an elevated temperature with an inorganic oxidizing agent which contains an element selected from the group consisting of halogen and oxygen and which is capable of oxidizing bromide ion to bromine in aqueous solution in the temperature range of about 30°–80° C., in the presence of free bromine in a concentration between about 0.01 and about 0.5 mol per gram atom of available oxygen in the oxidizing agent.

4. A process according to claim 3 in which an excess of said alkanol is employed, and an ester is produced.

5. A process for the oxidation of a secondary alkanol to a ketone which comprises contacting said alkanol in the liquid phase at an elevated temperature with an inorganic oxidizing agent which contains an element selected from the group consisting of halogen and oxygen and which is capable of oxidizing bromide ion to bromine in aqueous solution in the temperature range of about 30°–80° C., in the presence of free bromine in a molal concentration between about 0.01 and about 0.5 mol per gram atom available oxygen in the oxidizing agent.

6. A process for the oxidation of an alkanol to an organic carboxylic acid, which comprises contacting said alkanol in the liquid phase at an elevated temperature with an inorganic oxidizing agent which contains an element selected from the group consisting of halogen and oxygen and which is capable of oxidizing bromide ion to bromine in aqueous solution in the temperature range of 30°–80° C., in the presence of free bromine in a molal concentration between about 0.01 and about 0.5 mol per mol of oxidizing agent.

7. A process according to claim 6 in which an alcohol is present in the reaction mixture and an ester is produced.

8. A process according to claim 1, which is carried out in the presence of an oxidizing catalyst.

9. A process according to claim 2 in which the oxidizing agent contains both halogen and oxygen atoms.

10. A process according to claim 2 in which the oxidizing agent is a bromate salt.

11. A process according to claim 2 in which the oxidizing agent is an oxide of an amphoteric metal in a valence state of at least +4.

12. A process according to claim 2 in which the oxidizing agent is manganese dioxide.

13. A process according to claim 2 in which the oxidizing agent is chlorine.

14. A process according to claim 3 in which the alkanol is a polyhydric alkanol containing both a primary and a secondary hydroxyl group and the corresponding hydroxy ketone and keto acid are produced.

15. A process according to claim 2 in which the reaction mixture is maintained at its boiling point, and the reaction product is boiled off as formed.

16. A process for the oxidation of a primary alcohol to an ester which comprises contacting an excess of said alcohol in the liquid phase at an elevated temperature with an aqueous solution of a bromate salt, in the presence of free bromine in a concentration not greater than about 0.5 mole per gram atom of available oxygen in the oxidizing agent.

LADISLAUS GUILLAUME FARKAS.
OZJASZ SCHÄCHTER.

REFERENCES CITED

The following references are of record in the file of this patent:

UNITED STATES PATENTS

| Number | Name | Date |
|---|---|---|
| 1,114,735 | Davis | Oct. 27, 1914 |
| 2,369,181 | Rust | Feb. 13, 1945 |
| 2,380,675 | Rust | July 31, 1945 |

OTHER REFERENCES

Marek and Hahn, "The Catalytic Oxidation of Organic Compounds in the Vapor Phase" (1932), page 350.

Certificate of Correction

Patent No. 2,444,924.  July 13, 1948.

LADISLAUS GUILLAUME FARKAS ET AL.

It is hereby certified that errors appear in the printed specification of the above numbered patent requiring correction as follows: Column 9, line 55, claim 1, for the word "alkanols", third occurrence, read *alkanals*; line 71, claim 2, for the syllable "kanols" read *kanals*; and that the said Letters Patent should be read with these corrections therein that the same may conform to the record of the case in the Patent Office.

Signed and sealed this 21st day of September, A. D. 1948.

[SEAL]

THOMAS F. MURPHY,
*Assistant Commissioner of Patents.*